United States Patent Office 2,938,023
Patented May 24, 1960

2,938,023

MANUFACTURE OF GLUTATHIONE CONTAINING MERCAPTO GROUPS

Friedrich Weygand, Berlin-Frohnau, and Rudolf Geiger, Frankfurt am Main, Germany, assignors to Farbwerke Hoechst Aktiengesellschaft vormals Meister Lucius & Brüning, Frankfurt am Main, Germany, a corporation of Germany No Drawing. Filed Apr. 11, 1958, Ser. No. 727,801

Claims priority, application Germany Apr. 17, 1957

9 Claims. (Cl. 260—112)

The present invention relates to a process of preparing protein-forming substances containing mercapto groups. There have already been described processes for the preparation of protein-forming substances containing mercapto groups in which, after formation of the peptide linkages, the carboxyl groups are partially or wholly esterified with alcohols and in which the amino groups of the molecule are protected by the carbobenzoxy radical and the easily oxidizable mercapto groups in part by the benzyl radical. In order to liberate the protein-forming substances from such compounds it is necessary to split off in two steps the radicals bound in a different manner. In addition, the carbobenzoxy and benzyl radicals can only be split off by a relatively aggressive treatment, for example by means of metallic sodium in liquid ammonia. By these methods of working the yield is very much reduced.

Now a process of preparing protein-forming substances containing mercapto groups has been found wherein, with exclusion of oxygen, protein-forming substances containing from 1 to 20 amino acid units and from 1 to 3 mercapto groups and which either contain unchanged carboxyl groups or whose carboxyl groups are at least partially esterified with alcohols that contain 1 to 3 carbon atoms, are reacted at temperatures ranging between $-20°$ C. and $+60°$ C. with azides of N-trifluoroacetyl derivatives of protein-forming substances containing from 1 to 20 amino acid units and no free carboxyl groups and wherein the N-trifluoroacetyl compounds are treated with dilute inorganic strongly basic hydroxides of metals at temperatuers ranging from $-10°$ C. to $+80°$ C.

The process of the present invention is carried out on the one hand in such a manner that the esters of the protein-forming substances containing the mercapto groups or also the protein-forming substances containing the free mercapto groups—when using the free compounds these are advantageously applied in the form of their salts, for example the alkali metal salts—are dissolved in a solvent such as dioxane, tetrahydrofuran, acetonitrile, chloroform, ethyl acetate, diisopropyl ether or nitromethane. It is also possible to use mixtures of solvents. In addition, it is possible to use aqueous organic solvents whereas sometimes the application of absolute solvents may also be of advantage. On the other hand azides of protein-forming substances not containing any free carboxyl groups, that is to say whose carboxyl groups, if present, are esterified with alcohols containing 1 to 3 carbon atoms such as methanol, ethanol, propanol, isopropanol, are dissolved in the above mentioned solvents. The two solutions of the reactants are combined in any desired sequence. The substances to be reacted can be used in equimolecular quantities. Often the use of a slight excess of the azide component of 0.01 to 0.5 mol, preferably of 0.05 to 0.1 mol, is of advantage. The reaction may be carried out at temperatures ranging between $-20°$ C. and $+60°$ C. preferably between $-10°$ C. and $+40°$ C. Temperatures below $-20°$ C. are also possible but in this case the reaction velocity is reduced in accordance therewith. If it is desired to particularly accelerate the reaction it is of advantage to raise the temperature, for example from $20°$ C. to $40°$ C. At temperatures above $60°$ C. the decomposition of the azides while nitrogen is split off is already noticeable and the yield is generally reduced so that higher temperatures will only be applied in special cases, for example, if the reaction takes a very rapid course or if the azide is slowly added to the reaction mixture.

The entire reaction with substances containing free mercapto groups is suitably carried out with exclusion of oxygen in order to prevent the oxidation. Generally, a protective gas, such as nitrogen, carbon dioxide, hydrogen or noble gases, such as argon, is used in order to exclude the atmospheric oxygen.

Upon termination of the reaction the solvent or the mixture of the solvents is distilled off under reduced pressure. The solvent can also be eliminated by lyophilization or another suitable process. In many cases it is also possible directly to carry out the next process step without eliminating the solvent.

The alcohol and N-trifluoroacetyl radicals are subsequently split off from the reaction products with exclusion of oxygen in the abovementioned solvents by means of dilute inorganic strongly basic metal hydroxides. As such there may be used for example alkali metal or alkaline earth metal hydroxides such as potassium hydroxide, sodium hydroxide, baryum hydroxide and calcium hydroxide, in a concentration of 0.01 N to 2 N, preferably 0.5 to 1 N. The operation is carried out at temperatures ranging between $-10°$ C. and $+70°$ C., preferably at $0°$ C. to $+30°$ C.

As protein-forming substances containing 1 to 3 mercapto groups there may be used amino acids such as cysteine or its esters with alcohols containing 1 to 3 carbon atoms such as methyl, ethyl, propyl and isopropyl esters and lower peptides built up from 2 to 20 amino acids such as the free peptides or the peptides wholly or partially esterified with alcohols containing 1 to 3 carbon atoms. Lower peptides containing a mercapto group and 2 to 8 amino acids are preferably used. The following peptides are used in their free form or esterified at the carboxyl group or groups.

H₂N—CH—(CH₂SH)—CO—NH—CH—(CH₂OH)—CO—NH—CH—[CH₂—CH—(CH₃)₂]—COOH,
H₂N—CH—(CH₂OH)—CO—NH—[CH—(CH₃)₂]—CO—NH—CH—(CH₂SH)—CO—NH—CH—(CH₂SH)—CO—NH—CH—[CH₂—CH—(CH₃)₂]—CO—NH—CH—(CH₂SH)—COOH,
H₂N—CH—(CH₂SH)—CO—NH—CH—(CH₂SH)—COOH,
H₂N—CH—(CH₂SH)—CO—NH—CH₂—CO—NH—CH—[CH—(CH₃)₂]—CO—NH—CH—(CH₂OH)—CO—NH—CH—[CH—(CH₃)—(C₂H₅)]—CO—NH—CH—(CH₂—CONH₂)—CO—NH—CH₂—CO—NH—NH—CH₂—CO—NH—CH—(CH₃)—CO—NH—CH—(CHOH—CH₃)—CO—NH—CH—[CH₂—CH(CH₃)]—CO—NH—CH₂—COOH,
H₂N—CH—(CH₂SH)—CO—NH—CH—(CH₂—CH₂—COOCH₃)—CO—NH—CH—(CH₂—CH₂—COOCH₃)—COOH,
H₂N—CH—(CH₂SH)—CO—NH—CH—(CH₂OH)—CO—NH—CH—(CH₂—CH₂—COOH)—CO—NH—CH₂—COOH,
H₂N—CH—(CH₂SH)—CO—NH—CH—[(CH₂)₄—NH—COCH₃]—COOH,
H₂N—CH—(CH₂SH)—CO—NH—CH₂—COOH,
H₂N—CH—(CH₂SH)—CO—NH—CH₂—COOC₂H₅,
H₂N—CH₂—CO—NH—CH—(CH₂SH)—CO—NH—CH—(CH₃)—COOH,
H₂N—CH—(CH₂SH)—CO—NH—CH—(CH₂OH)—COOH,
H₂N—CH—(CH₂—CH₂—COOH)—CO—NH—CH—)CH₂—COOH)—CO—NH—CH—(CH₂SH)—CO—N⎡CH—CH₂—CH₂—CH₂⎤—CO—NH—CH—[CH₂—CH—(CH₃)₂]—CO—NH—CH₂—COOH,
H₂N—CH—(CH₂—C₆H₅OH)—CO—NH—CH—(CH₂—C₆H₅)—CO—NH—CH—(CH₂—CH₂—CONH₂)—CO—NH—CH—(CH₂—CONH₂)—CO—NH—CH—(CH₂SH)—CO—N⎡CH—CH₂—CH₂—CH₂⎤—CO—NH—CH₂—[(CH₂)₄NH₂]—CO—NH—CH₂—COOH.

The indicated compounds are preferably used in the form of their esters with aliphatic alcohols containing 1 to 3 carbon atoms.

As azide component there come into consideration azides of N-trifluoroacetylated amino acids and peptides containing 2 to 20, preferably 2 to 8 amino acids such as $CF_3$—CO—NH—$CH_2$—CO—$N_3$,
$CF_3$—CO—NH—CH—($CH_3$)—CO—$N_3$,
$CF_3$—CO—NH—CH—[CH—($CH_3$)$_2$]—CO—$N_3$,
$CF_3$ — CO — NH — CH — [$CH_2$ — CH — ($CH_3$)$_2$]—CO—$N_3$,
$CF_3$—CO—NH—CH—($CH_2$—$C_6H_5$)—CO—$N_3$,
$CF_3$—CO—NH—CH—($CH_2$OH)—$CON_3$,
$CF_3$—CO—NH—CH—($CH_2$—$C_6H_4$OH)—$CON_3$,
$CF_3$—CO—NH — CH — [($CH_2$)$_4$ — NH — $COCF_3$]—$CON_3$,
$CF_3$ — CO — NH — CH — ($CH_3$) — CO — NH— CH — ($CH_2$OH) — CO — NH — CH — [CH—($CH_3$)$_2$]—CO—$N_3$
$CF_3$ — CO — NH — $CH_2$ — CO — NH — CH — ($CH_2$ — $C_6H_5$) — CO — NH — CH —[($CH_2$)$_4$— NH—CO—$CF_3$]—$CON_3$,
$CF_3$CO — NH — CH — (CHOH — $CH_3$) — CO — NH — CH — [$CH_2$ — CH — ($CH_3$)$_2$] —CO —NH— $CH_2$ — CO — NH — CH — ($CH_2$ — $COOCH_3$)—CO—NH—CH—($CH_2$—$CH_2$—$COOCH_3$)—$CON_3$,
$CF_3$ — CO — NH — CH — ($CH_2$ — $CONH_2$) — CO— NH — CH — [($CH_2$)$_4$ — NH — CO — $CF_3$]—CO—NH—$CH_2$—$CON_3$,
$CF_3$ — CO — NH — CH — ($CH_2$ — $C_6H_4$OH)—CO— NH — CH — [CH($CH_3$)$_2$] — CO — NH — CH—($CH_2$OH) — CO — NH — CH — ($CH_2C_6H_5$)— CO — NH — $CH_2$ — CO — NH — CH — [($CH_2$)$_4$— NH—CO—$CF_3$]—$CON_3$.

These azides may not carry any free carboxyl groups. In the case of dibasic amino acids such as aspartic acid or glutamic acid there are used the N-trifluoroacetyl ester compounds in which the one carboxyl group is esterified with an alcohol containing 1 to 3 carbon atoms, for example $CF_3$ — CO — NH — CH — ($CH_2$ — $CH_2$ — COO— $CH_3$)—CO—$N_3$.
$CF_3$ — CO — NH — CH — ($CH_2$ — $CH_2$ — COO— $C_2H_5$)—CO—$N_3$,
$CF_3$—CO—NH — CH — ($COOC_2H_5$) — $CH_2$ — $CH_2$— $CON_3$,
$CF_3$—CO—NH—($CH_2$—COO—$CH_3$)—CO—$N_3$,
$CF_3$—CO—NH—CH—($CH_2$—COO—$C_3H_7$)—CO—$N_3$.

The process of the present invention has the advantage of allowing the N-trifluoroacetyl and alcohol groups to be eliminated in one process step. The yield is thereby increased as compared with the hitherto known processes. The process may also serve for the preparation of peptides which are otherwise only difficultly accessible. The peptides that are prepared according to the process of the present invention may be used for pharmaceutic or synthetic purposes. The following example serves to illustrate the invention but it is not intended to limit it thereto:

EXAMPLE.—N - TRIFLUOROACETYL - GLUTATHIONE DIETHYL ESTER (a) *Cysteinyl-glycine ethyl ester.*—0.9 gram of L-cysteinyl-glycine ethyl ester hydroiodide (2.68 mols) are dissolved in 10 cc. of absolute, freshly distilled tetrahydrofurane and, in a nitrogen atmosphere, there is added 0.53 cc. of dicyclohexylamine (2.7 millimols). The dicyclohexyl-ammonium iodide precipitates in a quantitative yield and is filtered off.

(b) *N-trifluoroacetyl-L-glutamic acid-1-ethyl ester-5-azide.*—0.782 gram of N-trifluoroacetyl-L-glutamic acid-1-ethyl ester-5-chloride (2.7 millimols) is shaken for 1 hour in 10 cc. of freshly distilled, absolute tetrahydrofuran with 0.7 gram of dicyclohexyl-ammonium-azide (3.12 millimols). The precipitated dicyclohexyl-ammonium chloride is filtered off and the acid azide that has formed is used in the solution.

(c) The solutions obtained according to (a) and (b) are combined and allowed to stand for 15 hours at room temperature under a nitrogen atmosphere. After having distilled off the tetrahydrofuran under reduced pressure, the crystalline residue of N-trifluoroacetyl-glutathione diethyl ester is collected on a suction filter and washed with a little ice-cold ethanol (boiled and allowed to cool under a nitrogen atmosphere). The yield amounts to 1.07 grams (86% of the theoretical yield). The product melts at 159–161° C. After recrystallization from a little alcohol there is obtained 0.93 gram (75% of the theoretical yield) melting at 163° C. For analysis the product is recrystallized once more from alcohol. The melting point is 165.5° C. $(\alpha)_D^{20}$: —41.7° (c.=0.7 in absolute ethanol).

*Glutathione* (1.01 grams of N-trifluoroacetyl-glutathione diethyl ester).—2.2 millimols are dissolved in 10 cc. of freshly distilled dioxane and allowed to stand for 1 hour at 15° C. with 8.8 cc. of a 1 N-sodium-hydroxide solution under a nitrogen atmosphere. 3.3 cc. of 2N–HJ (freshly prepared and colorless) are added and the whole is concentrated under a high vacuum at a maximum bath temperature of 30° C. until a syrup is obtained. When slowly adding warm, freshly distilled acetone a flocculent precipitate is formed which is well filterable on the next day. It is filtered off with suction under a $CO_2$ pressure and washed 3 times with acetone. The yield amounts to 0.445 gram (66% of the theoretical yield). The product is still slightly hygroscopic. It melts from 180° C. with foaming. $(\alpha)_D^{20}$: —18.6° (c.=1 in water). After recrystallization from water and ethanol there are obtained 0.237 gram (35% of the theory) melting at 188–190° C. (with decomposition). $(\alpha)_D^{20}$: —20.1° (c.=0.95 in water) in accordance with the literature. As melting point there are indicated in literature 190° C. and 192° C.

$C_{10}H_{17}O_6N_3S$ (307.3): Calculated for C, 39.08; H, 5.58; N, 13.67. Found for C. 38.86; H, 5.46; N, 13.45.

The starting materials for the process of the present invention were prepared as follows:

(1) *N-trifluoroacetyl-L-glutamic acid-1-ethyl ester*

1.0 gram of N-trifluoroacetyl-L-glutamic acid-5-ethyl ester 1-dicyclohexylamine salt (62.2 millimols) is dissolved in 15 cc. of ethanol of 60% strength and shaken for 10 minutes with about 10 grams of an ion exchanger in the H+-form containing sulfo groups. The syrup remaining after evaporation of the solution under reduced pressure crystallizes completely on rubbing. For analysis a sample is recrystallized from benzene (melting point: 76–77° C.) $(\alpha)_D^{20}$:—42.9° (c.=2 in absolute ethanol).

$C_9H_{12}O_5NF_3$ (271.3): Calculated for C, 39.86; H, 4.46; N, 5.17. Found for C, 40.13; H, 4.52; N, 5.25.

(2) *N-trifluoroacetyl-L-glutamic acid-1-ethyl ester-5-chloride*

(a) *From the free acid.*—0.27 gram of the N-trifluoro-acetyl-glutamic acid-1-ethyl ester (1 millimol) is dissolved in 10 cc. of benzene and heated for 15 minutes with 0.5 cc. (6.5 millimols) of thionyl chloride. After evaporation under reduced pressure there are added and distilled off two times 10 cc. each of benzene in order to remove all the thionyl chloride. The yield amounts to 0.27 gram (92% of the theory). For analysis the compound is sublimed under a pressure of 0.05 mm. of mercury and at a bath temperature of 90° C. Melting point: 89–90° C. $(\alpha)_D^{20}$:—15.2° (c.=1.393 in glacial acetic acid).

$C_9H_{11}O_4NClF_3$ (289.6): Calculated for C, 37.35; H, 3.83; N, 4.84. Found for C, 37.51; H, 3.90; N, 5.20.

(b) *From the dicyclohexylamine salt.*—1.375 grams of the dicyclohexylamine salt of the N-trifluoroacetyl-glutamic acid-1-ethyl ester (3.0 millimols) are heated to boiling for 45 minutes in 30 cc. of benzene with 3.0 cc.

of thionyl chloride. After cooling the mixture to 0° C. and allowing it to stand for 1 hour at this temperature the dicyclohexylammonium chloride that has formed is filtered off (0.644 gram=91% of the theory). The filtrate is evaporated to dryness under reduced pressure. The residue is dissolved twice in benzene and evaporated again under reduced pressure. The yield amounts to 0.865 gram (99% of the theory). After purification by sublimation in the high vacuum there is obtained 0.760 gram (87% of the theory). Melting point: 88–89° C.

(3) L-cysteinyl-glycine-ethyl ester hydroiodide (a) *Bis-carbobenzoxy-L-cystine* (Biochemical Preparations, II, 87, Chapman & Hall, London 1952; M. Bergmann and L. Zervas, Ber. dtsch. chem. Ges. 65, 1192 (1932)).—From 10 grams of L-cystine there are obtained with 27.5 grams of carbobenzoxy-chloride (about 80%) and 285 cc. of a 1 N-sodium hydroxide solution after acidification of the reaction solution, taking up of the resulting oil in ethyl acetate and crystallization from chloroform 17.4 grams (82% of the theory) of bis-carbobenzoxy-L-cystine melting at 108–110° C. By recrystallization from ethyl acetate and chloroform the melting point rises to 113–114° C. (literature: 113–115° C., 123° C., corrected).

(b) *Bis-carbobenzoxy-L - cystine - bis - glycine - ethyl ester.*—4.5 grams of bis-carbobenzoxy-L-cystine (9 millimols) are transformed into the acid chloride with 21 millimols of $PCl_5$ by shaking with ether at −10° C. The acid chloride is filtered off by means of a sintered glass filter, washed with absolute ether and reacted immediately at 0° C. with 5.5 grams (54 millimols, excess of 50%) of glycine-ethyl ester in ethyl acetate. The precipitate formed is filtered off, extracted with water (after previous drying) and the residue is recrystallized from n-propanol. The yield amounts to 11.6 grams (75% of the theory, calculated upon bis-carbobenzoxy-L-cystine). Melting point: 162–163° C. (literature: 166° C., corrected).

(c) *L-cysteinyl-glycine-ethyl ester hydroiodide.*—2.0 grams of bis-carbobenzoxy-L-cysteinyl-bis-glycine-ethyl ester (2.95 millimols) and 2.0 grams of phosphonium iodide (12.5 millimols) in 20 cc. of glacial acetic acid are allowed to stand for 3½ hours at 45–50° C. After filtration, concentration under reduced pressure and inoculation, crystallization sets in very soon (inoculation crystals are obtained by trituration of a sample with ether). The yield amounts to 1.78 grams (90% of the theory, literature: 95%). Melting point: 111–113° C. (literature: 115° C.).

We claim:
1. A method for preparing glutathione which comprises (A) reacting, with exclusion of oxygen and at a temperature in the range from about −20° C. to about +60° C., a $C_1$ to $C_3$ alcohol ester of cysteinyl-glycine with an N-trifluoro glutamic acid-5-azide whose 1-carboxyl group is esterified with an alcohol having from one to three carbon atoms and (B) treating the resulting N-trifluoroacetyl compound at a temperature in the range from about −10° C. to about +80° C. with a dilute, inorganic, and strongly basic metal hydroxide.

2. The method defined in claim 1 wherein step A is carried out at between about −10° C. and +40° C.

3. The method defined in claim 1 wherein step A is carried out at about 20° C.

4. The method defined in claim 1 wherein step A is carried out in tetrahydrofuran as a solvent.

5. The method defined in claim 1 wherein step B is carried out at between about 0 and +30° C.

6. The method defined in claim 1 wherein step B is carried out at about 15° C.

7. The method defined in claim 1 wherein the metal hydroxide in step B is sodium hydroxide.

8. A method for preparing glutathione which comprises (A) reacting, with exclusion of oxygen and at a temperature in the range from about −20° C. to about +60° C., a $C_1$ to $C_3$ alcohol ester of cysteinyl-glycine with N-trifluoroacetyl - L - glutamic acid-1-ethylester-5-azide in tetrahydrofuran as a solvent and (B) treating the resulting N-trifluoroacetyl compound at a temperature in the range from about −10° C. to about +80° C. with a dilute, inorganic, and strongly basic metal hydroxide.

9. A method for preparing glutathione which comprises (A) reacting, with exclusion of oxygen and at about room temperature, cysteinyl-glycine ethylester with N-trifluoroacetyl-L-glutamic acid-1-ethylester-5-azide in tetrahydrofuran as a solvent and (B) treating the resulting N-trifluoroacetyl-glutathione-diethylester with 1 N sodium hydroxide at about +15° C.

References Cited in the file of this patent

Anson et al.: Advances in Protein Chem., vol. 5, p. 9 (1948).

Anson et al.: Advances in Protein Chem., vol. 12, p. 472 (1957).